Patented May 19, 1942

2,283,261

UNITED STATES PATENT OFFICE 2,283,261

YELLOW AZO DYESTUFFS

Otto Kaiser, Basel, Switzerland, assignor to the firm of Society of Chemical Industry in Basle, Basel, Switzerland No Drawing. Application July 12, 1940, Serial No. 345,239. In Switzerland July 12, 1939

6 Claims. (Cl. 260—153)

This invention is concerned with the preparation of new azo dyestuffs which are remarkable for their pronounced affinity for cellulose and regenerated cellulose, particularly for textiles which consist of or contain these materials, for example, mixtures of wool with artificial fibres of regenerated cellulose. They dye such materials in greenish-yellow to reddish-yellow shades, and the fastness to light and the wet fastnesses of these dyeings may be increased by aftertreatment with metallic salts, particularly with copper salts. This metallisation may take place simultaneously with the dyeing process.

The new dyestuffs are characterized by the general formula K(R)$_n$, in which K represents the radical of a heterocyclic compound containing at least two and not more than three exchangeable halogen atoms, of which at least two have been exchanged, (R)$_n$ represents a number of radicals of colorless and yellow amino compounds corresponding to the figure $n$, which figure represents either 2 or 3, of which amino compounds one of the hydrogen atoms of the NH$_2$ group has been interchanged in each case with one of the halogen atoms mentioned, at least two of the amino compound radicals being yellow aminoazo compounds, and of which yellow aminoazo compounds:

(a) At least one contains at least once a member of the group consisting of

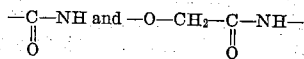

and at the most 2 azo-groups, (b) At least one contains COOH- and OH-groups in the ortho position to each other in a benzene nucleus and in which yellow aminoazo compounds, (c) Both the aryl radical linked with two azo groups and those linked with one azo group and one group selected from the group consisting of

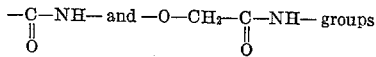

mentioned, as well as the aryl radicals linked with the amino group of the aminoazo compound, belong to the benzene series.

Those dyestuffs which are of particular value if they contain more than once a benzene nucleus which is substituted by a OH-group and a carboxyl group standing in the ortho position to this OH-group, are prepared by known methods for the manufacture of such products.

As parent substances of the radicals which correspond to the formula (R)$_n$, mention may be made of:

sulfonic acids of aminoazo compounds of the general formula

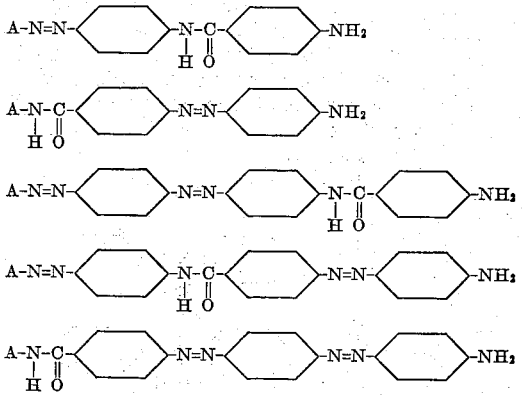

in which the

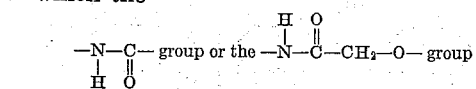

may stand in the meta position to the NH$_2$-group or to the N=N-group, and in which the benzene nuclei may carry substituents, such as halogen atoms, methyl groups and O-alkyl groups. The manner in which these dyestuffs may be obtained may be seen without difficulty from the formulae given. The sulfonic acid group stands, as a rule, in the radical A of the diazo-component. This radical A may consist of a nucleus of the benzene or of the naphthalene series. As examples of such parent diazocompounds, mention may be made of:

2-aminonaphthalene-6:8-disulfonic acid
2-aminonaphthalene-3:6-disulfonic acid
2-aminonaphthalene-3:6-trisulfonic acid
1-aminonaphthalene-4-sulfonic acid
1-aminonaphthalene-5-sulfonic acid
2-aminonaphthalene-6-sulfonic acid
1-aminonaphthalene-6-sulfonic acid
2-aminonaphthalene-8-sulfonic acid
1-aminonaphthalene-7-sulfonic acid
1-aminonaphthalene-3:6-disulfonic acid
1-aminonaphthalene-4:7-disulfonic acid
1-aminobenzene-3-sulfonic acid
1-aminobenzene-4-sulfonic acid
1-amino-2-methylbenzene-4-sulfonic acid
1-amino-2-chlorobenzene-5-sulfonic acid
1-amino-4-chlorobenzene-1-sulfonic acid
1-aminobenzene-2:5-disulfonic acid
1-aminobenzene-3:5-disulfonic acid
1-amino-4-hydroxybenzene-5-carboxylic acid
1-amino-4-hydroxybenzene-5-sulfo-3-carboxylic acid
1-amino-2-hydroxybenzene-5-sulfo-3-carboxylic acid
1-aminobenzthiazolsulfonic acid
Dehydrothiotoluidine monosulfonic acid etc.

As middle components which may be used in the manufacture of such compounds, those of the benzene series come into consideration, such as aniline, which may advantageously be used in the form of its ω-methane sulfonic acid, also ortho or meta-toluidine, para xylidine, cresidine, aminohydroquinone dimethyl ether, etc. The introduction of the

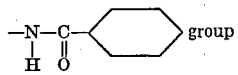 group is carried out in known manner with the help of para- or meta-nitrobenzoyl chloride. Compounds of similar behaviour are obtained when these chlorides are replaced by those of para-, ortho or meta-nitrophenoxyacetic acid, or by corresponding cresoxyacetic acid derivatives.

In the products of the formula mentioned above, however, the radical A may also be the radical of a coupling component. This is so, for example, in the case of the compounds of the general formulae:

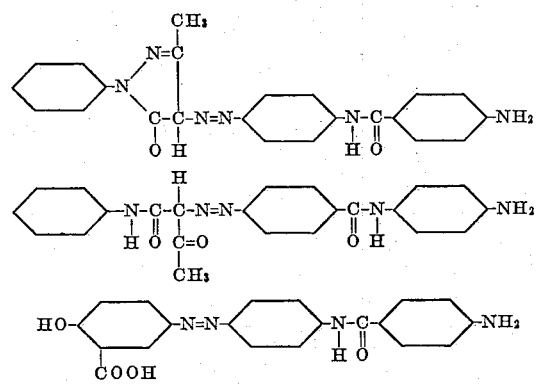

in which at least one of the benzene nuclei may carry a sulfonic group, in which, also the benzene nuclei may also carry substituents, such as halogen atoms, methyl or O-alkyl groups, and in which the group

may be replaced by the group

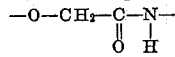

which group may also be placed in the meta position to the NH₂ and the —N=N— groups. The formulae indicate how these dyestuffs may be obtained.

As further parent substances of the radical corresponding to the formula (R)n, mention may be made of compounds such as:

4'-amino-4-hydroxy-1:1'-azobenzene-3-carboxylic acid
2'-methyl-4'-amino-4-hydroxy-1:1'-azobenzene-3-carboxylic acid
2':5'-dimethyl-4'-amino-4-hydroxy-1:1'-azobenzene-3-carboxylic acid
2'-methyl-5'-methoxy-4'-amino-4-hydroxy-1:1'-azobenzene-3-carboxylic acid
4'-(4''-aminobenzoyl)-amino-4-hydroxy-1:1'-azobenzene-3-carboxylic acid
4'-(4''-aminobenzoyl)-amino-2-hydroxy-1:1'-azobenzene-3-carboxy-5-sulfonic acid
4'-(4''-aminobenzoyl)-amino-2'-methyl-4-hydroxy-1:1'-azobenzene-3-carboxy-5-sulfonic acid Should the components already described on page 1, col. 1, line 53 to page 2, col. 1, line 53, possess in a benzene nucleus an OH— and a COOH— group in the ortho position to one another, it is also possible to use yellow components which do not possess this grouping, for instance, aminoazobenzene or its sulfonic acid. Complicated structures may also be used, for example, aminoazo dyestuffs, which are already formed by the help of heterocyclic compounds containing exchangeable halogen atoms.

Further colorless amino compounds, such as ammonia, mono- and diethylamine, aniline, 1-aminobenzene-4-sulfonic acid, monomethylaniline, monoethylaniline, monohydroxyethylaniline, 1-amino-4-hydroxybenzene-5-carboxylic acid, a- and b-naphthylamine and their sulfonic acids, paraphenylene-diamine, etc. are also suitable.

As parent substances of the heterocyclic radical K come into question first of all cyanuric halides, such as cyanuric chloride, also compounds such as tribromopyrimidine, dichlorophenyltriazine, dichloromethylpyrimidine, 2:6-dichloroquinazoline, dichlorophthalazine, etc.

From this it follows that, in the formula given above, K stands for the radical of a heterocyclic six-membered system, whose heterocyclic six-membered ring consists of carbon and nitrogen atoms, of which at least three and not more than four are carbon atoms and at least two and not more than three are nitrogen atoms, not more than two nitrogen atoms being linked with each other, which heterocyclic six-membered ring contains at least twice and not more than three times the atom grouping

The R groups of the formula mentioned above are then attached to one of the valencies of the carbon atoms by

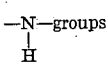

which themselves originate from the amino groups which are characteristic of the amino compounds—this expression also includes the yellow aminoazo dyestuffs or aminoazo compounds—which correspond to the radical R.

From this it also follows that the new products also correspond to the sulfonic acids of the dyestuffs of the following formula

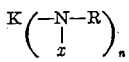

wherein K has the significance given above, n stands for a whole figure which is not less than 2 and not greater than 3, wherein at least two of the

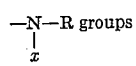

stand for radicals of yellow aminoazo compounds, of which (a) At least one contains at least once a member of the group consisting of

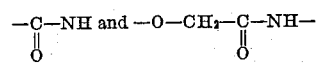

and at the most two azo-groups.

(b) At least one contains COOH— and OH— groups in the ortho position to each other in a benzene nucleus, and in which yellow aminoazo compounds (c) Both the aryl radicals linked with two azo groups and those linked with one azo group and one group selected from the group consisting of

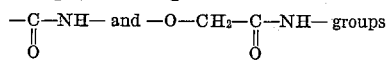

mentioned, as well as the aryl radicals linked with the amino group of the aminoazo compound, belong to the benzene series, and wherein at the most, one radical

stands for the radical of an amino compound by the presence of which the colour of the remaining portion of the molecule is not disturbed, that is to say, it stands for the radical of a colorless or of a yellow amino compound, and wherein, finally, $x$ stands for hydrogen if

is the radical of a yellow amino dyestuff and for hydrogen or alkyl if

represents the radical of a colorless compound.

It is thus possible to obtain the dyestuffs of the formula explained above by causing a heterocyclic compound containing exchangeable halogen atoms of the type described to react on the one hand, with a yellow aminoazo compound containing at the most 2 azo groups and an

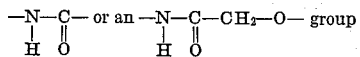

in which both the aryl radicals linked with two azo groups and those linked with one azo group and one of the two groups, —NH—CO— and —NH—CO—CH₂—O—, as well as the aryl radicals united with the amino group of the aminoazo compound, belong to the benzene series, and, on the other hand, with any yellow aminoazo compound, the two aminoazo compounds being chosen in such a manner that at least one of them contains a COOH group and an OH group standing in the ortho position to one another in one benzene nucleus, and, if a halogen atom is yet present in the heterocyclic compound, causing it to react, if desired, with a yellow or colorless amino compound. It is also possible to carry out the condensation with the heterocyclic compound containing the halogen atoms in another sequence.

A number of dyestuffs of the general formula K(R)ₙ, which has already been explained on p. 2, such as, for example, the dyestuffs which are derived from the aminoazo compounds described by their formulae on page 2, may be prepared in another manner. Thus, instead of allowing at least two of the yellow aminoazo compounds to react with the heterocyclic compound containing the exchangeable halogen atoms, at least one of these reactions may be replaced by that in which one of the exchangeable halogen atoms is allowed to react with an amino compound which, in addition to the amino group intended to take part in the reaction, contains a second, diazotisable amino group, or an atomic grouping capable of being converted into a group of this nature. After the reaction has been completed and, if desired, the convertable group has been transformed into a diazotisable amino group, this latter may be diazotised, and the diazo compound thus formed may then be united with a suitable coupling component. By a suitable coupling component is here to be understood a coupling component which unites with diazo compounds to form yellow azo dyestuffs, such as, for example, salicylic acid or a compound with an enolisable keto group, such as a 5-pyrazolone, or an arylide of acetoacetic acid, or even resorcinol, dihydroxyquinoline, etc. The choice of the amino compound which is to be reacted with the heterocyclic compound and that of the coupling components depends naturally on the remaining portion of the molecule of the dyestuff to be prepared. Should the remainder of the dyestuff molecule already contain the radical of a yellow aminoazo compound, which in its turn contains or should contain a benzene nucleus, in which an OH- and a COOH-group stand in the ortho position to one another, a coupling component may be selected which does not contain a benzene nucleus with an OH-group and a COOH-group in the ortho position to each other, such as, for example, a simply constructed acetoacetic anilide or a pyrazolone derivative, or dihydroxyquinoline. In case the remainder of the molecule of the dyestuff to be prepared does not contain the radical of a yellow aminoazo compound which itself contains, or should contain, a —CO—NH— or —CH₂—O—CO—NH— group as described above, the amino compound to be caused to react with the heterocyclic compound should contain a grouping of this nature.

Further, the new dyestuffs may also be obtained by carrying out one of the reactions with an amino compound which is so constructed that it contains in addition to the amino group, an atomic group which is capable of uniting with diazo compounds to form yellow dyestuffs. When the reaction is complete, the formation of the azo dyestuff is continued by uniting the coupling components thus obtained with a suitable diazo compound.

Since, in the preparation of all dyestuffs here coming in question, processes of analogy are to be used which are given directly by the constitution of the dyestuff intended, it is shown by the following compilation of formulae according to which method of carrying out the process claimed the dyestuffs in question are or may be prepared.

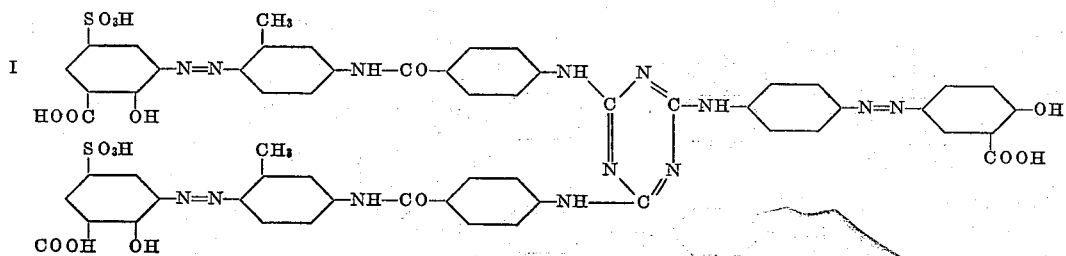

II 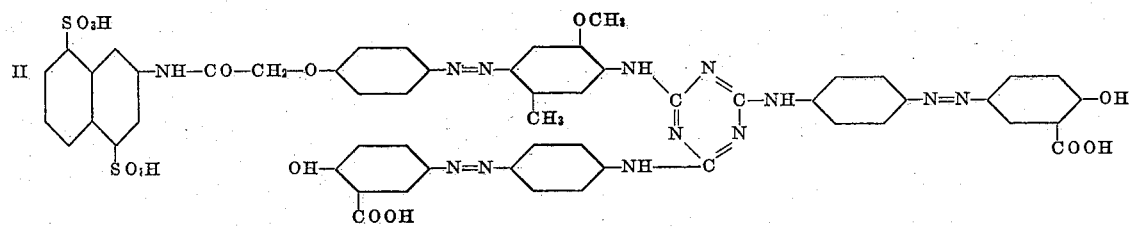
III 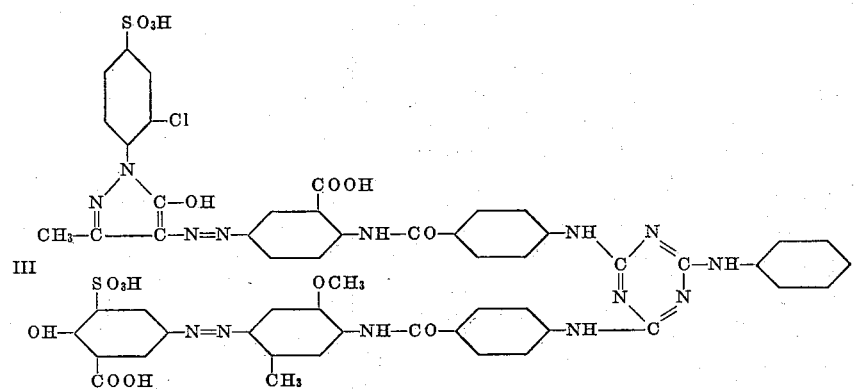
IV 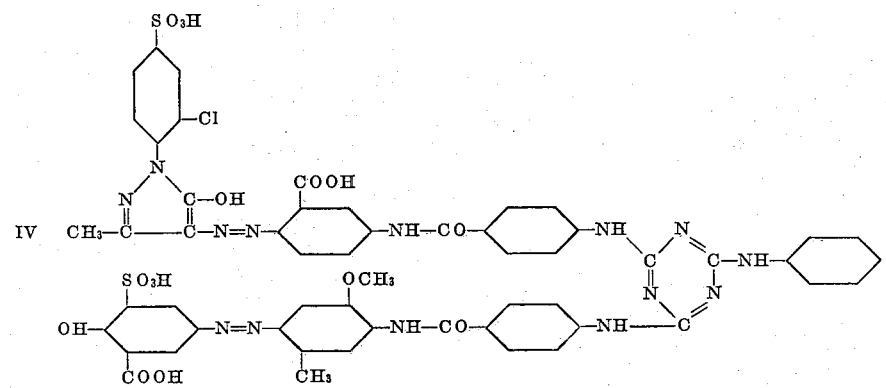
V 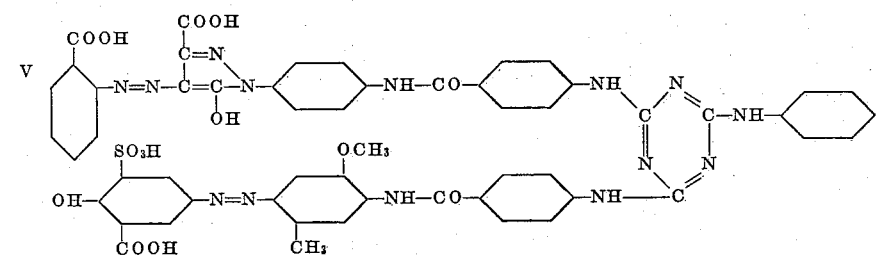
VI 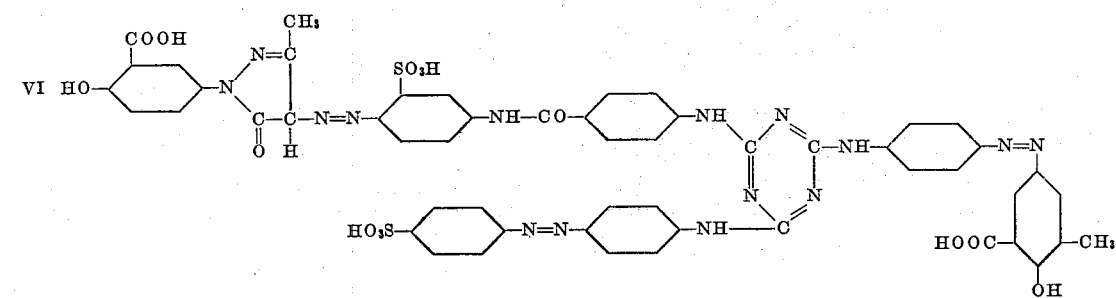
VII 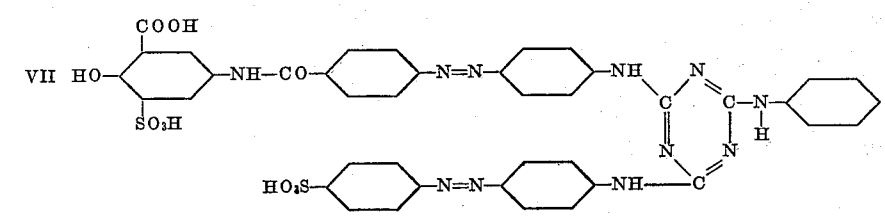

VIII 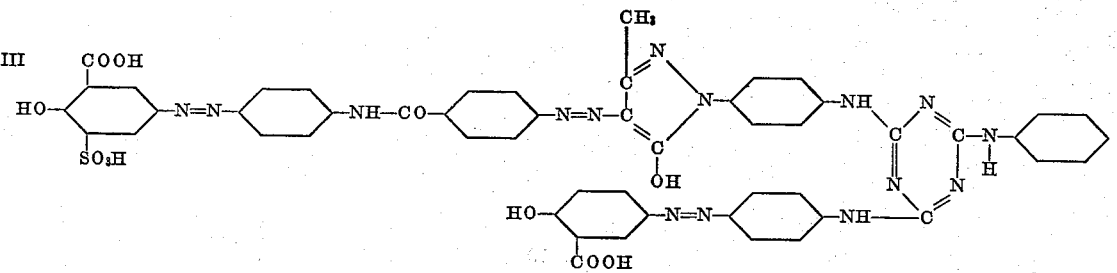
IX 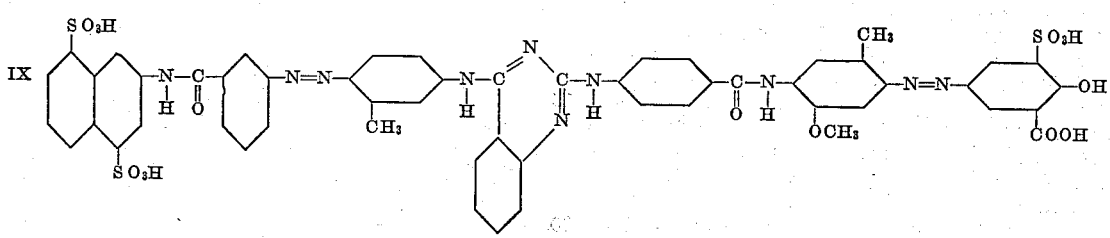
X 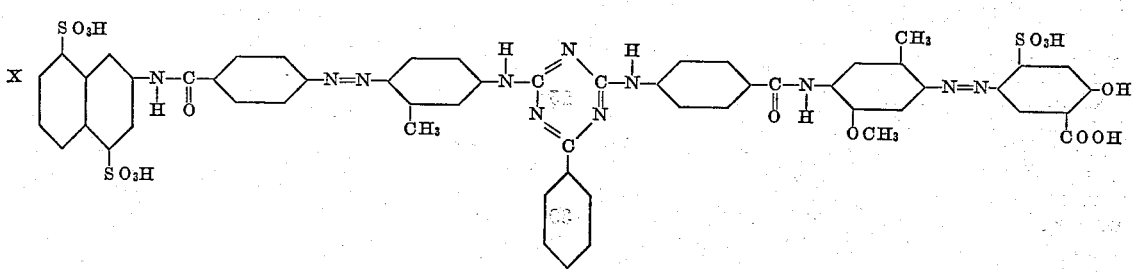
XI 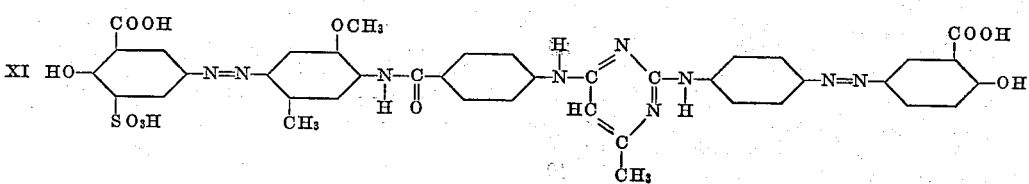
XII 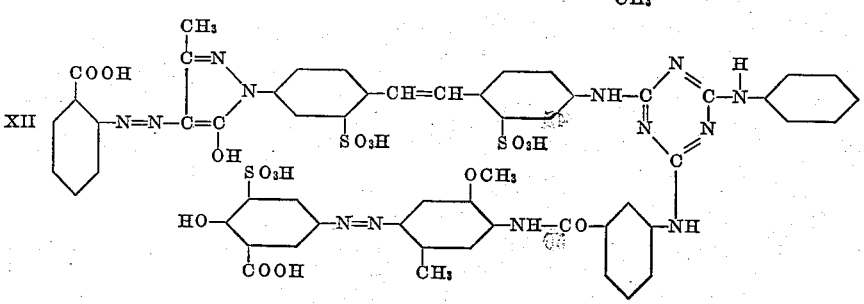
XIII 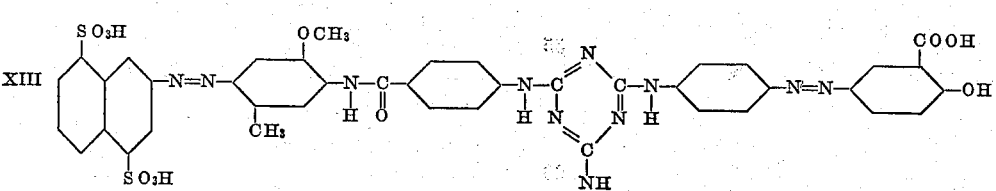

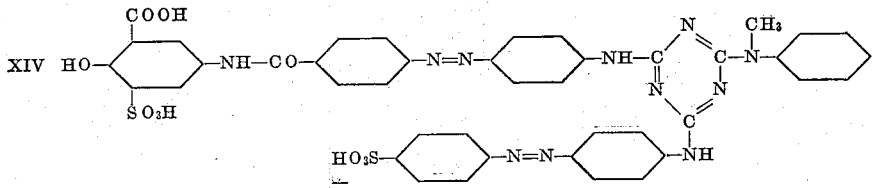

Example 1

54 parts of the monoazo dyestuff obtained from diazotised 3'-aminobenzoyl-2-aminonaphthalene-4:8-disulfonic acid and 1-methyl-3-aminobenzene are added, in the form of a neutral solution in 500 parts of water, to a paste consisting of 18.4 parts of cyanuric chloride in 500 parts of cold water. The hydrochloric acid which is formed by the condensation is neutralised by the addition of the corresponding quantity of sodium carbonate. Hereupon, 27.8 parts of the sodium salt of 4-amino-4'-hydroxy-1:1'-azobenzene-3'-carboxylic acid, dissolved in 500 parts of water, are added and the temperature raised to 40° C. The hydrochloric acid evolved during the ensuing reaction is carefully neutralised with sodium carbonate. After 2 hours, a further 24 parts of the sodium salt of 4-amino-4'-hydroxy-1:1'-azobenzene-3'-carboxylic acid dissolved in 400 parts of water are added, and the temperature is maintained at 80° C. for 3 hours, after which time the tertiary condensation product has been formed. It is now precipitated by means of sodium chloride, filtered off and dried. The product is a yellow brown powder which dyes cotton in yellow shades fast to washing from a weakly alkaline bath in the presence of copper sulphate and sodium tartrate.

If the 3'-aminobenzoyl-2-aminonaphthalene-4:8-disulfonic acid in the above example be replaced by 4'-aminobenzoyl-2-amino-naphthalene-4:8-disulfonic acid, a dyestuff is obtained which dyes cotton in reddish yellow shades.

Example 2

57 parts of the monoazo dyestuff obtained from diazotised 3'-aminobenzoyl-2-aminonaphthalene-4:8-disulphonic acid and 1-methyl-3-amino-4-methoxybenzene are added, in the form of a neutral solution in 500 parts of water, to a paste containing 18.4 parts of cyanuric chloride in 500 parts of cold water. The hydrochloric acid evolved by the condensation is neutralised by the corresponding quantity of sodium carbonate, whereupon 27.8 parts of the sodium salt of 4-amino-4'-hydroxy-1:1'-azobenzene-3'-carboxylic acid, dissolved in 500 parts of water, are run in, and the temperature is raised to 40° C. The hydrochloric acid liberated during the course of the reaction is cautiously neutralised with sodium carbonate. After 2 hours, a further 24 parts of the sodium salt of 4-amino-4'-hydroxy-1:1'-azobenzene-3'-carboxylic acid, dissolved in 400 parts of water, are added, and the temperature is maintained at 80° C. for 3 hours, after which time the tertiary condensation product has been formed. It is then precipitated by means of sodium chloride and dried. The product is a yellow brown powder and dyes cotton in yellow shades fast to washing from a weakly alkaline dyebath in the presence of copper sulphate and sodium tartrate.

If the 1-methyl-3-amino-4-methoxybenzene used in the above example be replaced by 1-methoxy-2-aminobenzene, a dyestuff is obtained which dyes cotton in similarly yellow shades which possess the same properties.

The corresponding dyestuffs obtained from 4'-amino-benzoyl-2-aminonaphthalene-4:8-disulfonic acid dye the cellulose fibre in redder shades.

Example 3

54 parts of the monoazo dyestuff obtained from diazotised 4'-aminobenzoyl-2-aminonaphthalene-4:8-disulfonic acid and 1-methyl-3-aminobenzene are added, in the form of a neutral solution in 2500 parts of water, to a paste containing 18.4 parts of cyanuric chloride in 500 parts of cold water. The hydrochloric acid evolved by the condensation is neutralised by the corresponding quantity of sodium carbonate, after which 5.4 parts of 1:4-diaminobenzene, dissolved in 50 parts of water, is run in and the temperature is raised to 40° C. The hydrochloric acid produced during the course of the reaction is neutralised cautiously by 5 parts of sodium carbonate. After 4 hours, 27.8 parts of the sodium salt of 4-amino-4'-hydroxy-1:1-azobenzene-3'-carboxylic acid dissolved in 500 parts of water, are added, and the temperature is maintained at 80° C. for 3 hours. After this time, the ditertiary condensation product has been formed, and it is precipitated by means of sodium chloride and dried. The product is a brown powder which dyes cotton in yellow shades fast to washing from a weakly alkaline bath in the presence of copper sulphate and sodium tartrate.

Example 4

45.1 parts of the monazo dyestuff obtained from diazotised 2-aminonaphthalene-4:8-disulfonic acid and 1-methyl-3-amino-4-methoxybenzene are dissolved in the form of the sodium salt in 500 parts of water by addition of 13.5 parts of sodium acetate. This solution is treated at about 60° C. with 18.5 parts of 4-nitrobenzoyl chloride, to which 5 parts of acetone have been added. The nitrobenzoyl product is reduced at 65–70° C. to the aminobenzoyl product by means of 42 parts of crystallised sodium sulphide dissolved in 70 parts of water.

57 parts of the precipitated reduction product are added in the form of a neutral solution in 1000 parts of water to a paste containing 18.4 parts of cyanuric chloride in 500 parts of cold water. The hydrochloric acid which is formed by the condensation is neutralised by the corresponding quantity of sodium carbonate. There are now added 5.4 parts of 1:4-diamino-benzene dissolved in 50 parts of water. The temperature is then raised slowly to 40° C. and is maintained at 40–45° C. for 2 hours, after which 27.8 parts of the sodium salt of 4-amino-4'-hydroxy-1:1'-azobenzene-3'-carboxylic acid, dissolved in 500 parts of water, are added to the condensation product and the temperature is maintained at 80° C. for 3 hours, after which time the di-tertiary condensation product has been formed.

The product is a brown powder which dyes cotton in reddish yellow shades fast to washing from a weakly alkaline bath in the presence of copper sulphate and sodium tartrate. Viscose staple fibre is dyed in similar shades.

Example 5

40 parts of dehydrothiotoluidine disulfonic acid are dissolved in the form of the sodium salt in 500 parts of water by addition of 13.5 parts of sodium acetate. This solution is treated at 60° C. with 18.5 parts of nitrobenzoyl chloride, to which has been added 5 parts of acetone. The nitrobenzoyl product is reduced to the aminobenzoyl product by treatment with 42 parts of crystalline sodium sulphide, dissolved in 75 parts of water, at 65–70° C.

63.7 parts of the monazo dyestuff obtained from the above reduction product by separation and further diazotisation and coupling with 1-methyl-3-aminobenzene are added, in the form of a neutral solution in 1000 parts of water, to a paste containing 18.4 parts of cyanuric chloride in 500 parts of cold water, the hydrochloric acid which is formed by the condensation being neutralised by the corresponding quantity of sodium carbonate. Hereupon, 27.8 parts of the sodium salt of 4-amino-4'-hydroxyl-1:1'-azobenzene-3'-carboxylic acid, dissolved in 500 parts of water, are run in, and the temperature is raised to 40° C. Hydrochloric acid which is evolved during the reaction is neutralised cautiously with sodium carbonate. After 2 hours, a further 24 parts of the sodium salt of 4-amino-4'-hydroxy-1:1'-azobenzene-3'-carboxylic acid, dissolved in 400 parts of water, are added, and the temperature is maintained for 3 hours at 80° C., after which time the tertiary condensation product has been formed. This is precipitated by means of sodium chloride and dried.

The product is a brown powder and dyes cotton in reddish yellow shades from a weakly alkaline bath in the presence of copper sulphate and sodium tartrate. The dyeings are fast to washing.

Replacement of the 4-nitrobenzoyl chloride by 3-nitrobenzoyl chloride leads to a similar product.

Example 6

70.2 parts of the monoazo dyestuff obtained from diazotised 3-amino-2-hydroxy-1-carboxy-benzene-5-sulfonic acid and 1-methyl-3-aminobenzene are dissolved in 500 parts of water in the form of their sodium salt with addition of 27 parts of sodium acetate. This solution is treated at about 60° C. with 39 parts of 4-nitrobenzoyl chloride, to which has been added 10 parts of acetone. The nitrobenzoyl product is reduced with 84 parts of crystalline sodium sulfide, dissolved in 150 parts of water, at 65–70° C., whereby the aminobenzoyl product is obtained.

94 parts of the separated reduction product are added, in the form of a neutral solution in 1000 parts of water, to a paste containing 18.4 parts of cyanuric chloride in 500 parts of cold water. The hydrochloric acid which is formed during the condensation is neutralised with the corresponding quantity of sodium carbonate. The temperature is slowly raised to 40° C. and is maintained at 40–45° C. for 2 hours, after which 27.8 parts of the sodium salt of 4-amino-4'-hydroxy-1:1'-azobenzene-3-carboxylic acid, dissolved in 500 parts of water, are added to the dicondensation product, and the temperature is maintained for 3 hours at 80° C., when the tertiary condensation product has been formed. It is separated by means of sodium chloride and dried. The product obtained is a yellow brown powder which dyes cotton in reddish yellow shades fast to washing from a weakly alkaline bath in the presence of copper sulfate and sodium tartrate.

If the 1-methyl-3-aminobenzene used in the above example be replaced by 1-methyl-3-amino-4-methoxybenzene, a dyestuff is obtained which dyes cotton in somewhat redder shades possessing the same fastness properties.

If the 3-amino-2-hydroxy-1-carboxy-benzene-5-sulfonic acid be replaced by 5-amino-2-hydroxy-1-carboxy-benzene-3-sulfonic acid, a product is obtained which dyes cotton in fast greenish yellow shades by the process mentioned.

Example 7

45.2 parts of the reduced monoazo dyestuff obtained from diazotised 2-nitro-5-aminobenzene-1-carboxylic acid and 2'-chlorophenyl-3-methyl-pyrazolone-4'-sulfonic acid are dissolved in the form of their sodium salt in 300 parts of water with addition of 13.5 parts of sodium acetate. This solution is treated at 60° C. with 18.5 parts of 4-nitrobenzoyl chloride, to which have been added 5 parts of acetone. The nitrobenzoyl product is reduced with 42 parts of crystalline sodium sulfide, dissolved in 70 parts of water, at 65–70° C., the aminobenzoyl compounds being obtained. 57.1 parts of the separated reduction product are added, in the form of a neutral solution in 500 parts of water, to a paste containing 18.4 parts of cyanuric chloride in 500 parts of cold water, and the hydrochloric acid formed during the condensation is neutralised by means of the corresponding quantity of sodium carbonate. 50 parts of the monoazo dyestuff 4''-aminobenzoyl-4'-amino-5'-methoxy-2'-methyl-4-hydroxy-3-carboxyl-1:1'-azobenzene-5-sulfonic acid, disolved in 500 parts of water in the form of its sodium salt, are added to the monocondensation product and the temperature is raised, at the same time, to 40° C. The hydrochloric acid formed during the condensation is neutralised with sodium carbonate. After 2 hours, 9.3 parts of aniline are added, and the temperature is maintained for 2 hours at 80° C., by which time the tertiary condensation product has been formed. It is separated by means of sodium chloride and dried.

The product obtained is a red brown powder which dyes cotton in yellow shades fast to washing from a weakly alkaline bath in the presence of copper sulfate and sodium tartrate.

If the 2-nitro-5-aminobenzene-1-carboxylic acid in the above example be replaced by 5-nitro-2-aminobenzene-1-carboxylic acid, a product is obtained which dyes cotton in the similar yellow shades having the same properties.

Example 8

36.7 parts of monoazo dyestuff obtained from diazotised 2-aminobenzene-1-carboxylic acid and 4-aminophenylpyrazolone-3-carboxylic acid, in the form of its sodium salt, are dissolved in 300 parts of water with an addition of 13.5 parts of sodium acetate. This solution is treated at 60° C. with 18.5 parts of 4-nitrobenzoyl chloride, to which have been added 5 parts of acetone. The nitrobenzoyl product is reduced to the aminobenzoyl product at 65–70° C. with 42 parts of crystalline sodium sulfide, dissolved in 70 parts of water.

48.6 parts of the isolated reduction product, in the form of a neutral solution in 500 parts of water, are added to a paste containing 18.4 parts of cyanuric chloride in 500 parts of cold water, the hydrochloric acid formed during the condensation being neutralised with the required quantity of sodium carbonate. Hereupon 50 parts of the monoazo dyestuff, 4''-aminobenzoyl-4'-amino-5'-methoxy-2'-methyl-4-hydroxy-3-carboxy-1:1'-azobenzene-5-sulfonic acid, in the form of its sodium salt, dissolved in 500 parts of water, are added to the monocondensation product, the temperature being simultaneously raised to 40° C. The hydrochloric acid formed during the condensation is neutralised with sodium carbonate. After 2 hours, 9.3 parts of aniline are added, and the temperature is maintained for the same time at 80° C., after which period the tertiary condensation product has been formed. It is isolated by means of sodium chloride and dried.

The product obtained is a brown powder which dyes cotton in yellow shades fast to washing from a weakly alkaline bath in the presence of copper sulfate and sodium tartrate.

*Example 9*

58.4 parts of the monoazo dyestuff obtained from diazotised 4'-aminophenoxyacet-2-aminonaphthalene-4:8-disulfonic acid and 1-methyl-3-amino-4-methoxybenzene, in the form of its sodium salt, are dissolved in 500 parts of water, and this solution is added to a paste containing 18.4 parts of cyanuric chloride in 500 parts of cold water, the hydrochloric acid produced during the condensation being neutralised with the required quantity of sodium carbonate. Hereupon 27.8 parts of the sodium salt of 4-amino-4'-hydroxy-1:1'-azobenzene-3'-carboxylic acid, dissolved in 300 parts of water, are added, and the temperature is slowly raised to 40° C. After 2 hours, the hydrochloric acid evolved is again neutralised and a further 24 parts of the sodium salt of 4-amino-4'-hydroxy-1:1'-azobenzene-3'-carboxylic acid, dissolved in 300 parts of water, are added, and the temperature is raised to 80° C. and maintained there for 3 hours. By this time, the tertiary condensation product has been formed and is isolated by means of sodium chloride and dried.

The product obtained is a yellow brown powder which dyes cotton in reddish yellow shades from a weakly alkaline bath in the presence of copper sulfate and sodium tartrate. The dyeings are fast to washing.

*Example 10*

76.2 parts of the monoazo dyestuff obtained from diazotised 5-amino-2-hydroxy-1-carboxybenzene-3-sulfonic acid and 1-methyl-3-amino-4-methoxybenzene, in the form of its sodium salt, are dissolved in 1000 parts of water with addition of 8.3 parts of sodium bicarbonate. This solution is treated at about 60° C. with 43 parts of 4-nitrophenoxyacetic acid chloride, to which 5 parts of acetone have been added. The nitrophenoxyacetic acid product is reduced at 65–70° C. with 84 parts of crystalline sodium sulfide, dissolved in 150 parts of water, to yield the aminophenoxyacetic acid product.

106 parts of the isolated reduction product are added, in the form of a neutral solution in 1000 parts of water, to a paste containing 18.4 parts of cyanuric chloride in 500 parts of cold water, the hydrochloric acid formed during the condensation being neutralised with the corresponding quantity of sodium carbonate. The temperature is gradually raised to 40° C. and is maintained for 2 hours at 40–45° C. Hereupon, 9.3 parts of aniline are added and the temperature is maintained at 80° C. for 2 hours, when the tertiary condensation product has been formed, and is isolated by means of sodium chloride and dried.

The product obtained is a yellow brown powder which dyes cotton in reddish yellow shades fast to washing from a weakly alkaline bath in the presence of copper sulfate and sodium tartrate.

*Example 11*

38.1 parts of the monoazo dyestuff obtained from diazotised 5-amino-2-hydroxy-1-carboxybenzene-3-sulfonic acid and 1-methyl-3-amino-4-methoxybenzene are dissolved in the form of the sodium salt in 300 parts of water with an addition of 13.5 parts of sodium acetate. This solution is treated with 18.5 parts of 4-nitrobenzoyl chloride, to which 5 parts of acetine has been added, at 60° C., after which the nitrobenzoyl product is reduced at 65–70° C. to the aminobenzoyl product by means of 42 parts of crystalline sodium sulfide dissolved in 70 parts of water.

50 parts of the isolated reduction product, in the form of a neutral solution in 500 parts of water, are added to a paste containing 18.4 parts of cyanuric chloride in 500 parts of cold water and the hydrochloric acid evolved during the condensation is neutralised by the corresponding quantity of sodium carbonate. Hereupon 60 parts of the monoazo dyestuff obtained from 2-aminobenzene-1-carboxylic acid and the pyrazolone of the formula

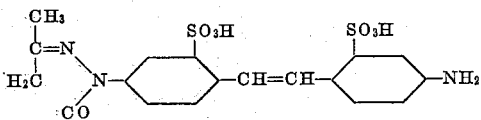

in the form of the sodium salt, dissolved in 500 parts of water, are added to the monocondensation product, the temperature being simultaneously raised to 40° C. The hydrochloric acid evolved during the condensation is neutralised by means of sodium carbonate. After 2 hours, 9.3 parts of aniline are added, and the temperature is maintained at 80° C. for the same period of time. After this time, the tertiary condensation product has been formed, and is isolated by means of sodium chloride and dried.

The product obtained is a yellow brown powder which dyes cotton in greenish yellow shades from a weakly alkaline bath in the presence of copper sulfate and sodium tartrate.

If, in place of the monoazo dyestuff obtained from 2-amino-benzene-1-carboxylic acid and the pyrazolone of the formula

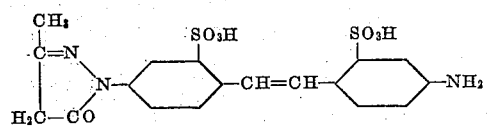

the monoazo dyestuff obtained from 2-amino-6-chlorobenzene-1-carboxylic acid and the pyrazolone of the formula

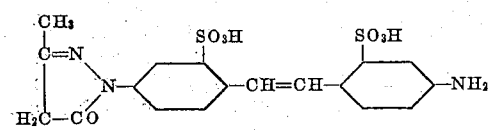

be used, a product is obtained which dyes cotton in similar shades, the dyeings possessing the same fastness properties.

What I claim is:
1. The sulfonic acids of the yellow azo dyestuffs of the general formula

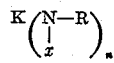

wherein K stands for the radical of a heterocyclic six-membered system, whose heterocyclic six-membered ring consists of carbon and nitrogen atoms, of which at least three and not more than four are carbon atoms and at least two and not more than three are nitrogen atoms, not more than two nitrogen atoms being linked with each other, which heterocyclic six-membered ring contains at least twice and not more than three times the atom grouping

with which the

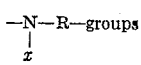

are connected by a valence of the carbon atom, wherein further $n$ stands for a whole figure which is not less than 2 and not greater than 3, wherein at least two of the

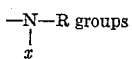

stand for radicals of yellow aminoazo compounds, of which (a) at least one contains at least once a member of the group consisting of

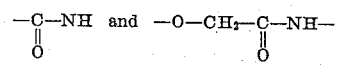

and at the most two azo groups, (b) at least one contains COOH— and OH—groups in the ortho position to each other in a benzene nucleus, and in which yellow aminoazo compounds (c) both the aryl radicals linked with two azo groups and those linked with one azo group and one group selected from the groups consisting of

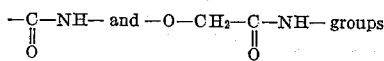

as well as the aryl radicals linked with the amino group of the aminoazo compound, belong to the benzene series, and wherein, at the most, one radical

stands for the radical of an amino compound by the presence of which the color of the remaining portion of the molecule is not disturbed, and wherein $x$ stands for hydrogen when

is the radical of a yellow amino dyestuff and for a member of the group selected from hydrogen and alkyl if

represents the radical of a colorless amino compound, which dyestuffs form yellow to brown powders, which dissolve in water in the form of their alkali salts to give yellow solutions and which dye cotton in yellow shades which become faster on the fibre on being after-coppered.

2. The sulfonic acids of the yellow azo dyestuffs of the general formula

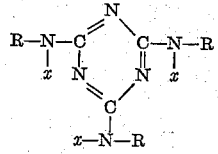

wherein at least two of the

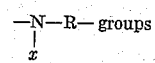

stand for radicals of yellow aminoazo compounds, of which (a) at least one contains at least once a member of the group consisting of

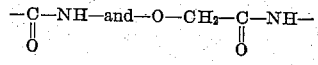

and at the most two azo-groups, (b) at least one contains COOH— and OH—groups in the ortho-position to each other in a benzene nucleus, and in which yellow aminoazo compounds (c) both the aryl radicals linked with two azo groups and those linked with one azo group and one group selected from the group consisting of

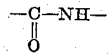

and

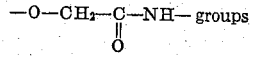

mentioned, as well as the aryl radicals linked with the amino group of the aminoazo compound, belong to the benzene series, and wherein, at the most, one radical

stands for the radical of an amino compound by the presence of which the color of the remaining portion of the molecule is not disturbed, and wherein $x$ stands for hydrogen when

is the radical of a yellow amino dyestuff and for a member of the group selected from hydrogen and alkyl if —N—R—
|
$x$ represents the radical of a colorless amino compound, which dyestuffs form yellow to brown powders, which dissolve in water in the form of their alkali salts to give yellow solutions and which dye cotton in yellow shades which become faster on the fibre on being after-coppered.

3. The sulfonic acids of the yellow azo dyestuffs of the general formula

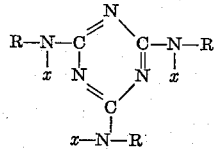

wherein at least two of the

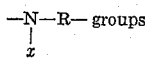

stand for radicals of yellow aminoazo compounds, of which (a) at least one contains at least once a member of the group consisting of

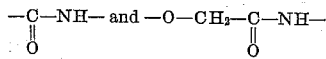

and at the most two azo-groups, (b) at least two contain COOH— and OH—groups in the ortho-position to each other in a benzene nucleus, and in which yellow aminoazo compounds, (c) both the aryl radicals linked with two azo groups and those linked with one azo group and one group selected from the group consisting of

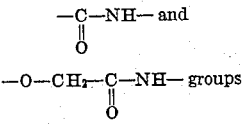

mentioned, as well as the aryl radicals linked with the amino group of the aminoazo compound, belong to the benzene series, and wherein, at the most, one radical

stands for the radical of an amino compound by the presence of which the color of the remaining portion of the molecule is not disturbed, and wherein $x$ stands for hydrogen when

is the radical of a yellow amino dyestuff and for a member of the group selected from hydrogen and alkyl if

represents the radical of a colorless amino compound, which dyestuffs form yellow to brown powders, which dissolve in water in the form of their alkali salts to give yellow solutions and which dye cotton in yellow shades which become faster on the fibre on being after-coppered.

4. The dyestuff having in the free state the formula

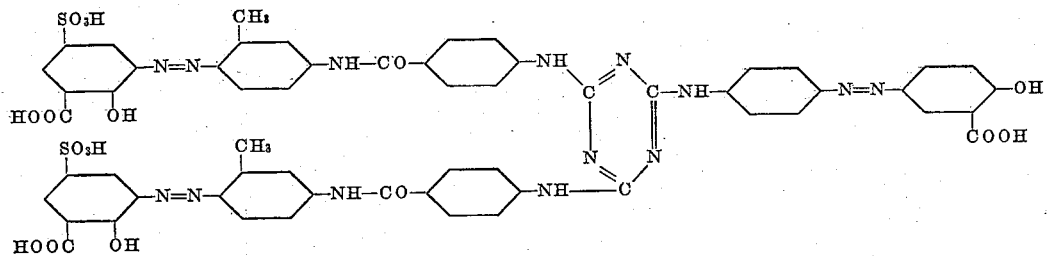

5. The dyestuff having in the free state the formula

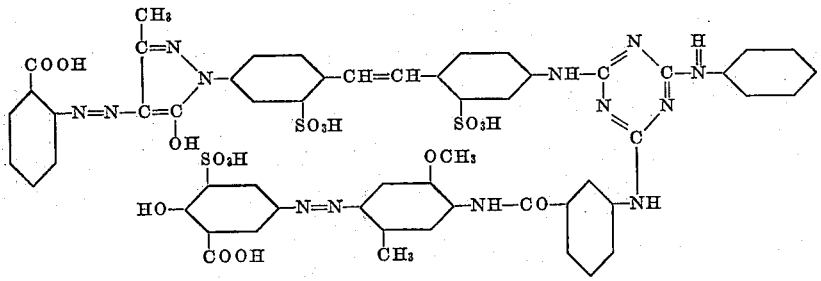

6. The dyestuff having in the free state the formula

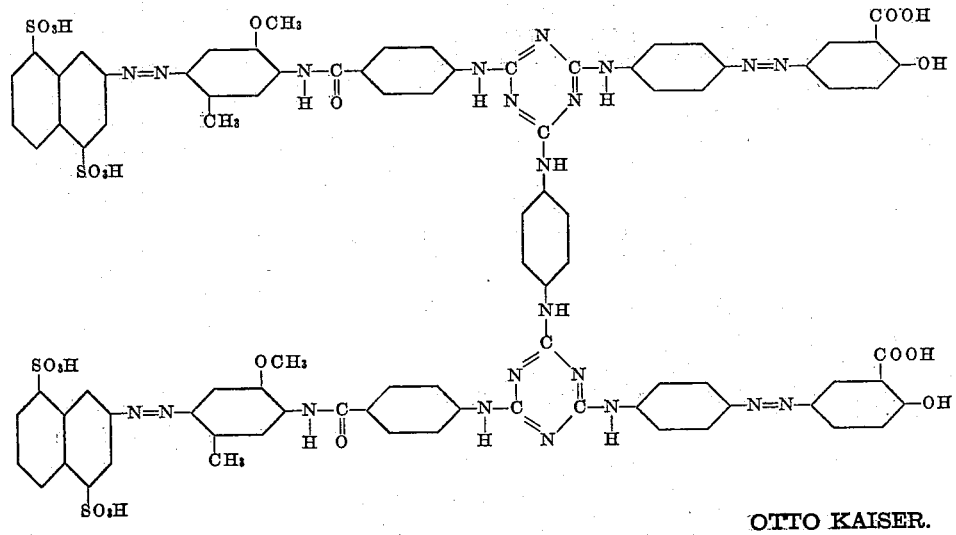

OTTO KAISER.